United States Patent [19]

Kato et al.

[11] Patent Number: 4,833,498

[45] Date of Patent: May 23, 1989

[54] CAMERA

[75] Inventors: Masatake Kato, Kunitachi; Akihiko Shiraishi, Kawasaki; Kenichi Kawamoto, Komae, all of Japan

[73] Assignee: Canon Kabushiki Kaisha, Tokyo, Japan

[21] Appl. No.: 218,460

[22] Filed: Jul. 11, 1988

Related U.S. Application Data

[63] Continuation of Ser. No. 916,610, Oct. 8, 1986, abandoned.

[30] Foreign Application Priority Data

Oct. 11, 1985 [JP] Japan ................................ 60-227512

[51] Int. Cl.⁴ ........................ G03B 7/20; G03B 17/18; H04N 5/235

[52] U.S. Cl. .................................... 354/410; 354/465; 354/286; 358/225

[58] Field of Search ............... 354/410, 435, 446, 455, 354/456, 465, 486; 358/225, 228

[56] References Cited

U.S. PATENT DOCUMENTS 4,529,288 7/1985 Nakai et al. ..................... 354/286 X

FOREIGN PATENT DOCUMENTS 26324 2/1985 Japan .

*Primary Examiner*—W. B. Perkey

*Attorney, Agent, or Firm*—Robin, Blecker & Daley

[57] ABSTRACT

This invention is based on the discovery of the fact that a proportional relationship exits between a reciprocal of an exit pupil of a photographic lens and an error in light measurement value and provides a camera which is characterized by the provision of means for measuring light of a beam passing through a photographic lens into the camera and deciding an exposure value, means for generating an information corresponding to the reciprocal of the exit pupil of the photographic lens and means for applying correction to said exposure value on the basis of the information generated by said information generating means.

22 Claims, 5 Drawing Sheets

| | COMMAND | LEVEL | OPE-RAND | CODE | CONTENT OF INQUIRY | ANSWER DATA | CONTENT IN EACH BYTE |
|---|---|---|---|---|---|---|---|
| TEST COMMAND | TEST COLOR | 1 | 0 | 48 | SPECTRAL CHARACTERISTICS OF LENS | 2 | $L^R/_G$ , $L^B/_G$ |
| | TEST LOSS | 1 | 0 | 4A | TRANSMISSION FACTOR OF LENS | 1 | ← |
| | TEST ID | 1 | 0 | 49 | MAKER, KIND, FUNCTION OF LENS | 7 | MAKER, KIND, FUNCTION OF LENS |
| | TEST EXIT PUPIL | 1 | 0 | 58 | POSITION OF EXIT PUPIL | 1 | RECIPROCAL OF EXIT PUPIL POSITION 1/mm |

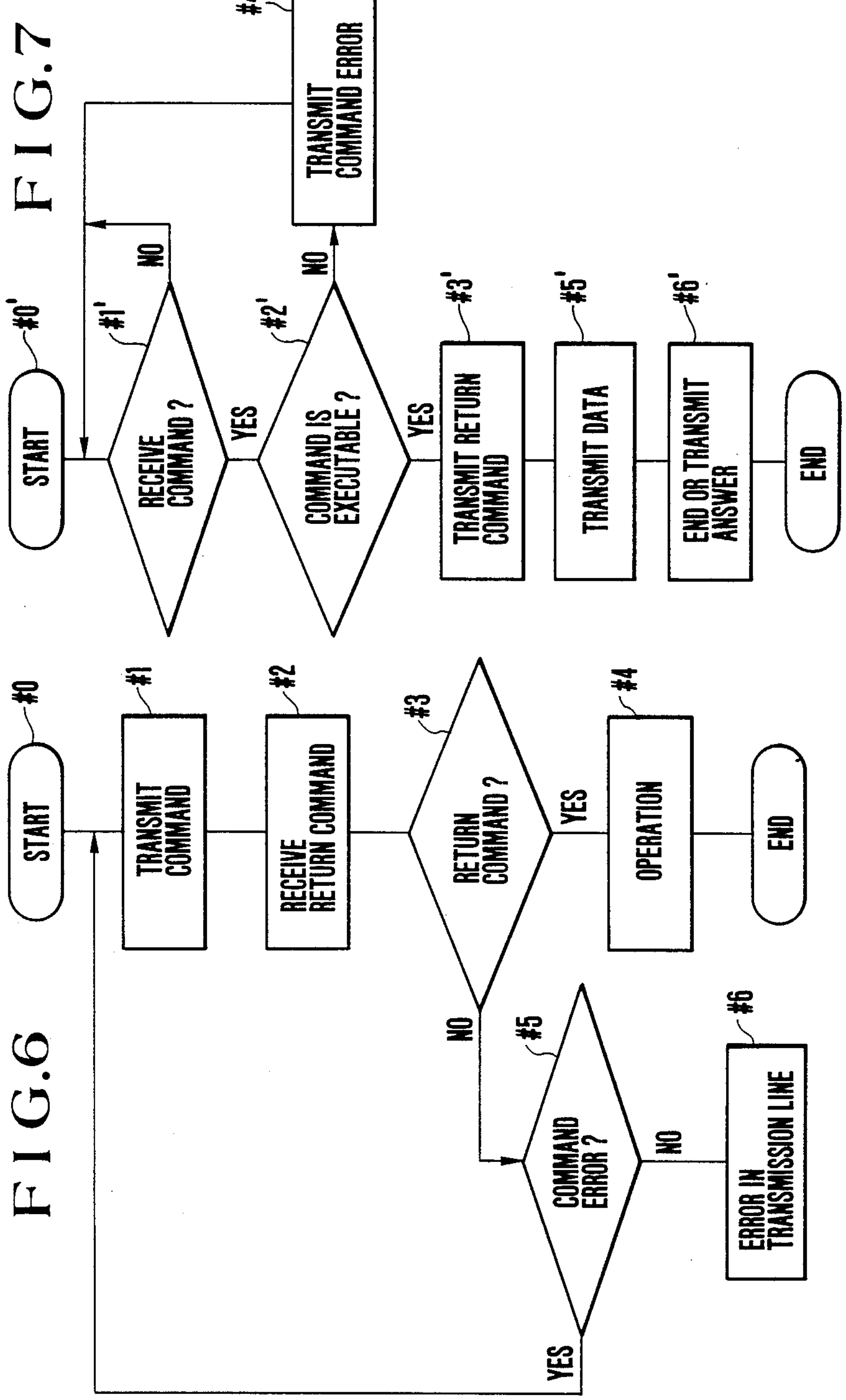
F I G.7
START
0'
RECEIVE COMMAND ?
1'
NO
YES
COMMAND IS EXECUTABLE ?
2'
NO
YES
TRANSMIT COMMAND ERROR
4
TRANSMIT RETURN COMMAND
3'
TRANSMIT DATA
5'
END OR TRANSMIT ANSWER
6'
END
F I G.6
START
0
TRANSMIT COMMAND
1
RECEIVE RETURN COMMAND
2
RETURN COMMAND ?
3
YES
OPERATION
4
END
NO
COMMAND ERROR ?
5
NO
ERROR IN TRANSMISSION LINE
6
YES

CAMERA

This application is a continuation of application Ser. No. 916,610, filed Oct. 8, 1986, now abandoned.

BACKGROUND OF THE INVENTION

1. Field of the Invention

The present invention relates to a camera and, more particularly, it relates to a camera having a light measuring device.

2. Description of the Related Art

Heretofore, a camera in which various data including open diaphragm value, focal length, etc. peculiar to the camera are stored in memory means arranged in an exchangeable lens and these data are read by means of reading means provided in a camera body, whereby an exposure control value is decided on the basis of these data and light value obtained by a light measuring device provided in the camera has been already known in the art.

In order to decide the exposure control value, the camera has a light measuring device of so-called TTL type (through-the-lens type). In this type of light measuring device, it has been recently found that owing to difference between the respective cameras an error sometimes occurs in an output of such light measuring device relatively to a brightness on an image surface produced by the photographic lens of each of the cameras, for example due to difference of exit pupil positions of the respective photographic lenses even if these photographic lenses have same F-number. Such phenomenon will be described, with reference to FIG. 9.

FIG. 9 is a diagrammatic view showing essential parts of a camera, for explaining the phenomenon in which an error in output of the light measuring device can occur owing to difference in exit pupil position of the respective photographic lenses. In FIG. 9, 1 is a lens, 5 is a light receiving element, 20 is a total reflection mirror, 40 is a beam divider for light measurement and 60 is an image surface. The total reflection mirror 20 is arranged to direct an optical path toward the beam divider 40 or toward the image surface 60. The beam divider 40 consists of prisms 40*a* and 40*b* which are adhered together.

In the above-described construction, if the lens has an exit pupil located at substantially infinite distance a principal beam E1 at outside of the optical axis of the lens is incident upon the baas divider 40 in perpendicular direction thereto, while if the lens has an exit pupil relatively near to the image surface a principal beam E2 a outside of the optical axis of the lens is incident upon said divider at some angle thereto.

Accordingly, the beam E1 and the beam E2 which have been deflected at a semi-transparent portion 40*c* formed at the adhered surfaces of the prisms are emitted from said divider 40 at different angles to each other, so that the quantities of light received by the light receiving element 5 disposed at the side of said divider are slightly different from each other. Therefore, even if the brightness at the image surface 60, to which the beam is focused, is same, a slight difference in output of the light receiving element 5 is produced, depending upon the position of the exit pupil of the lens.

Such a phenomenon, which has been known in the art, presents an important problem particularly in a camera which makes use of a solid-state image sensor having a narrower latitude than that of a silver salt film.

SUMMARY OF THE INVENTION

It is a first object of the present invention to provide a camera in which the problem as described above is solved.

It is a second object of the present invention to provide a camera which can effect a precise light measurement at all times, even if an error in light measurement is generated owing to difference in exit pupil position of photographic lenses.

In order to attain the objects as described above, we made studies and discovered that the error of the output of the light measuring device relatively to the brightness of the image surface produced by the photographic lens in the camera varies, while holding linear relationship with respect to a reciprocal of the exit pupil position of the photographic lens. Upon such discovery, we provides a device for solving the abovementioned problem which comprises means for measuring a light passing through a photographic lens and deciding an exposure value, means for producing an information corresponding to a reciprocal of exit pupil position of said photographic lens and means for correcting said exposure value according to the information produced by said information producing means.

It is a third object of the present invention to provide a camera simple in construction in which the abovementioned problem can be solved.

The other objects and characteristic features of the present invention will be understood from the descriptions which will be made with reference to the accompanying drawings.

BRIEF DESCRIPTION OF THE DRAWINGS

FIGS. 6 and 7 are flow charts showing algorithm executed in a microcomputer arranged in the camera body and a microcomputer arranged in the lens.

DETAILED DESCRIPTION OF THE PREFERRED EMBODIMENT

Figure 1:
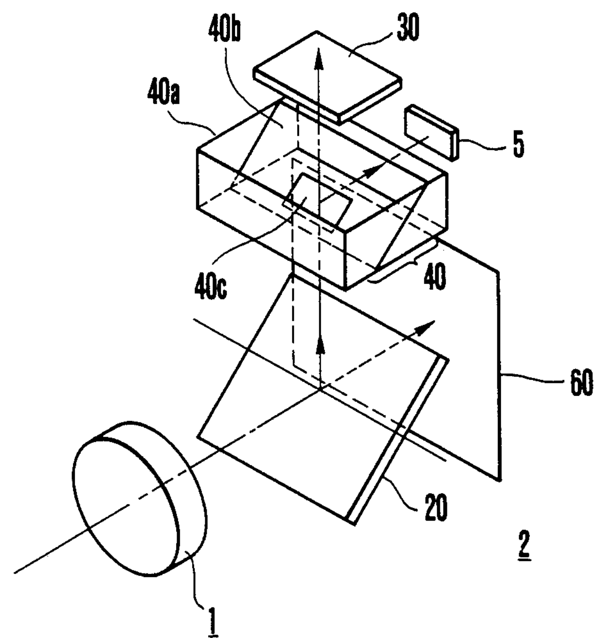
FIG. 1 is a diagrammatic view showing essential parts of the camera according to an embodiment of the present invention.

FIG. 1 illustrates the essential parts of the camera according to an embodiment of the present invention.

Referring to FIG. 1, a light beam which has passed through a photographing lens 1 is directed along an optical path for photographing toward an image surface 60 or it is deflected by a total reflection mirror 20 in upward direction and directed along an optical path for observation toward a finder. The light beam directed toward the finder is divided by a beam divider for light measurement 40 arranged near a focusing screen 30, which constitutes a focal surface. A part of the beam divided by the divider 40 is directed to an observor's pupil (not shown) and another part is directed to a light receiving element 5 for light measurement.

In general it is considered that a device for measuring light at a focal surface in which a beam divider for light measurement is arranged near the focal plane, as described above, is suitable as a light measuring device for a photographing device having narrow latitude, such as a device which makes use of a solid-state image sensor, since the device of this type has good proportionality of a diaphragm value of a photographic lens relative to quantity of light on an image surface (so-called F-number proportionality) and it is optimum for center-weighted light measurement. Under such circumstances, the embodiment as shown in FIG. 1 provides the beam divider 40 which consists of two wedge-shaped prisms 40*a* and 40*b* adhered together, with a semi-transparent portion 40*b* being formed therebetween to conduct a part of the incident beam to the light receiving element 5 for light measurement arranged at the side of said optical path divider.

Figure 2:
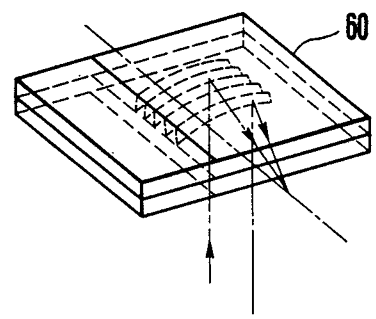
FIG. 2 illustrates a modified form of an optical path divider shown in FIG. 1.

A beam divider as shown in FIG. 2, which is disclosed in Japanese Laid-Open Patent Application No. Sho 58-106518, may be used in place of the beam divider as shown in FIG. 1. The beam divider as shown in FIG. 2 consists of a parallelepiped plate 60 in which a plurality of curved gratings are formed and semi-transparent portions are formed on sloping faces of said gratings.

Figure 3:
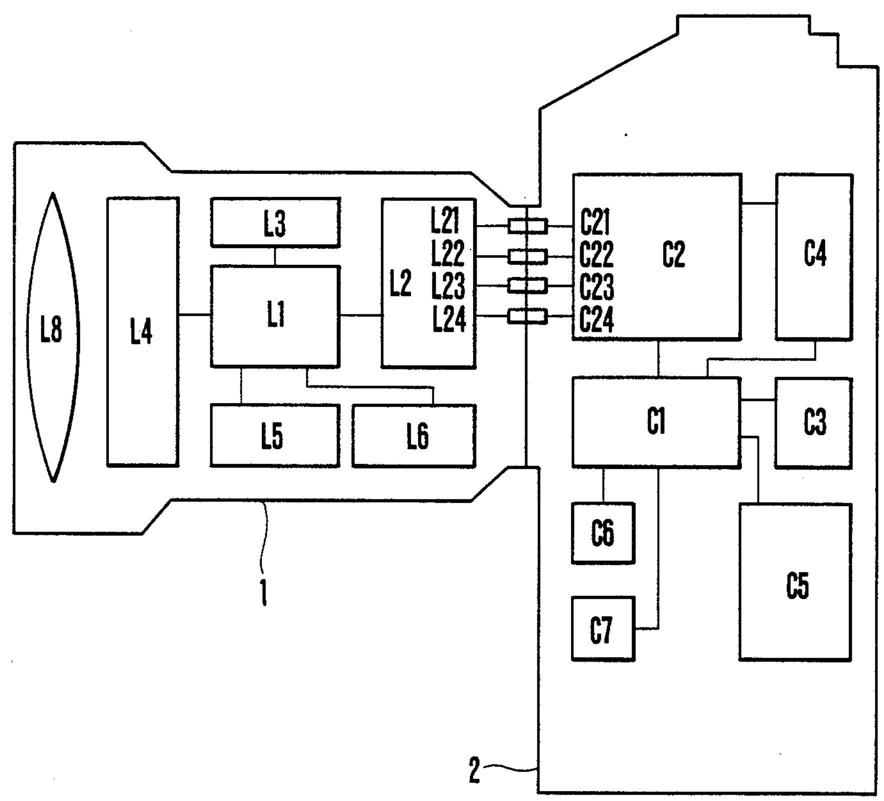
FIG. 3 is block diagram showing electrical circuits arranged in a photographic lens and a camera body of the camera shown in FIG. 1.
Figures 4, 5:
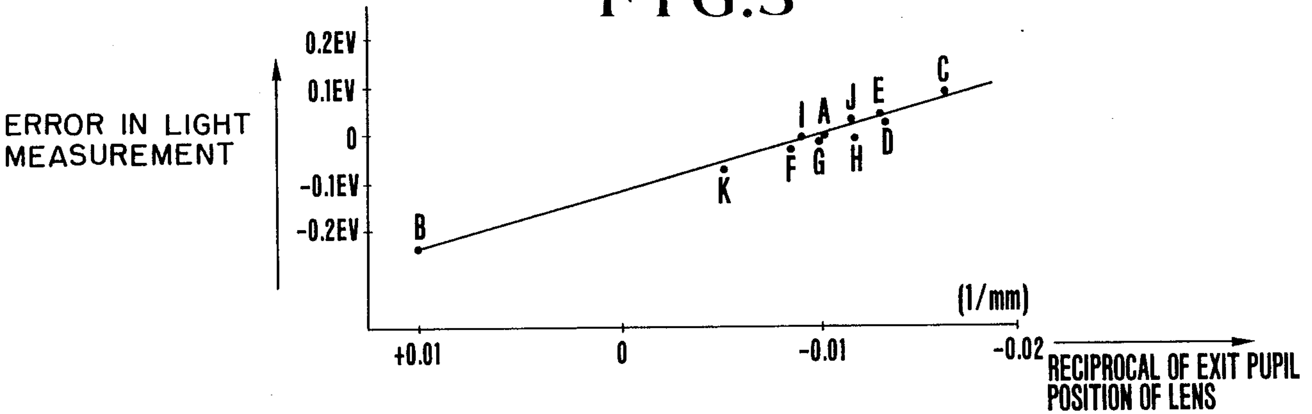
FIG. 4 is a diagram showing commands fed from the camera body through data terminals to the photographic lens, codes of these commands, contents of the commands, numbers of bytes of data fed from the photographic lens and kinds of data assigned to the data.
FIG. 5 is a diagram showing a relation between a reciprocal of exit pupil position and an error in light measurement value.

Now, an electrical circuit of a camera having an optical system as shown in FIG. 5 or 6 will be explained, with reference to FIGS. 3–6.

FIG. 3 is a block diagram showing communication between the photographic lens 1 and the camera body 2 in the embodiment as shown in FIG. 1. Referring to FIG. 3, the camera body includes a microcomputer for camera C1 and a main interface C2 having a source output terminal C21, a data terminal C22, a busy terminal C23 and a ground terminal C24. The camera body further includes a ROM C3 in which programs for the main microcomputer are stored, a power source C4, a disk drive unit 5 for driving a disk to record images formed in the camera body, a light measuring system C6 having an amplifying circuit and an automatic exposure control circuit of the light receiving element 5 shown in FIG. 1 and a distance measuring system 7.

The photographic lens 1 is detachably mounted on the camera body. Said photographic lens includes a microcomputer for lens L1, a lens interface L2 having a power source terminal L21, a data terminal L22, a busy terminal L23 and a ground terminal L24, a ROM L3 storing various informations concerning the lens 1 and programs concerning a sub-microcomputer, as hereinafter described, a diaphragm drive system L4, a focus drive system L5, a zoom drive system L6, and an imaging system L8 driven by said focus drive system L5 and said zoom drive system L6.

Next, an explanation will given to the various information stored in the ROM L3 of the photographic lens 1, with reference to FIG. 4. FIG. 4 shows commands fed from the camera body 2 through the data terminals C22 and L22 to the photographic lens 1, codes of the data, the contents of the commands, number of bytes of the data fed from the photographic lens 1, and kinds of data assigned to the bytes. The mark "←" indicates that the data equal to that described in the column of the content of data.

The content read by the command described in the item "Test Command" is a spectral characteristics of the photographic lens and includes 2 byte data indicating $L^{R}/G$ and $L^{B}/G$ based on the ratio of R, G and B of the beam which has passed through the lens.

The content read by the command described in the item "Test Loss" is a transmission factor of the photographic lens.

The content read by the command described in the item "Test ID" is data concerning maker, kind and function of the photographic lens. Each one of the data is assigned with a few bytes and it consists of seven bytes.

The content read by the command described in the item "Test Exit Pupil Position" is an exit pupil position of the photographic lens. In the embodiment, a reciprocal of the exit pupil position is adopted.

Now, the reason why the reciprocal of the exit pupil position is adopted as the content stored in the ROM L3 of the photographic lens will be explained with reference to FIG. 5.

FIG. 5 is a diagram showing a relation, in the form of dots A–K, between an error in light measurement, that is a difference between a brightness on the light receiving element 5 and a brightness on the image plane 60, which is incidated on its ordinate, and a reciprocal of the exit pupil position of each lens (mm), which is indicated on its abscissa. This diagram shows the case where the beam divider as shown in FIG. 2 is used in place of the beam divider for light measurement used in the camera shown in FIG. 1 and the camera is used within the range where there is no deflection in open-state light measurement, the diaphragm value being set about F-number of 5.6.

As shown in FIG. 5, there is a proportionality between the error in light measurement and the reciprocal of the exit pupil position. Accordingly, it is possible to easily correct the value of the light measurement at the camera side by storing the reciprocal of the exit pupil position in the ROM L3 of the photographic lens 1 and reading the stored information at the side of the camera.

Next, the sequence of sending and receiving the commands add the data as shown in FIG. 4 between the camera body 1 and the lens 1 will be explained, with reference to FIGS. 6 and 7.

FIG. 6 is the flow chart showing the algorithm executed by the microcomputer C1 of the camera body 2 and FIG. 7 is the flow chart showing the algorithm executed by the microcomputer L1 of the lens 1.

Firstly, the operation of the camera body 2 is started and the flow starts from the STEP #0 in FIG. 6. The STEP #1 is executed and one of the commands shown in FIG. 4 is transmitted from the camera body 2 to the lens. On the other hand, when the operation has started, the flow of the lens 1 starts from the STEP #0′ in FIG. 7 and the STEP #1′ is executed. In the STEP #1′ in FIG. 7, decision is made as to whether the the command has been transmitted from the camera body 1 to the lens 1 or not. If it is decided that the command has not been transmitted, the loop as is repeated, while if it is decided that the command has been transmitted, the flow proceeds to the STEP #2′. Accordingly, when the operation of the camera body 2 has been started and the STEP #1′ in FIG. 6 has been executed, the microcomputer L1 of the lens 1 receives the transmitted command and the flow proceeds from the STEP #1′ to the STEP

2' in FIG. 7. In the STEP #2' in FIG. 7, the lens 1 makes decision as to whether the transmitted command is executable or not. If it is decided that the transmitted command is executable, the flow proceeds to the STEP #7' in FIG. 7 and if it is decided that it not executable, the flow proceeds to the STEP #4'.

In the STEP #3' in FIG. 7, the command transmitted from the camera body 2 to the lens 1 is returned from the lens 1 to the camera body 2, as it is (in the form of a return command). After executing the STEP #3' in FIG. 7, the lens executes said command and transmits a designated data to the camera body 2 (STEP #5', FIG. 7). In the Step #4' in FIG. 7, the data indicating the "COMMAND ERROR" is transmitted to the camera body 5. In other words, according to the above-mentioned STEPS #2'–#5', in case where the command transmitted from the camera body 2 to the lens is an executable command, the lens 1 returns the transmitted command, as it is, from the lens 1 to the camera body 2, while in case where the command transmitted from the camera body 2 to the lens is not an executable command, the lens 1 transmits the "COMMAND ERROR", which indicates that the transmitted command is not executable, from the lens to the camera body 2. At this stage, the camera body 2 is prepared to receive the command transmitted from the lens 1, as shown in FIG. 6, STEP #2', and, when the lens has executed the STEP #3' or #4 in FIG. 7, it receives the data transmitted from the lens 1 to the camera body 2.

Then, the camera body 2 makes decision, in the STEP #3 in FIG. 6, as to whether the data transmitted from the lens 1 to the camera body 1 coincides with the command transmitted to the camera 1 in the STEP #1 in FIG. 6. If it is decided that the above-mentioned data transmitted to the camera body 2 coincides with the above-mentioned command transmitted to the lens, the camera body 2 receives the transmitted data and effects the operation, in the STEP #4, in accordance with said data, and the flow ends. If it is decided that the former does not coincides the latter, tee flow proceeds from the STEP #3 to the STEP #5 in FIG. 6 and decision is made in the STEP #5 as to whether the data transmitted from the lens to the camera body 2 in the STEP #3 is the data indicating the "COMMAND ERROR" or not. If it is decided that the transmitted data is the "COMMAND ERROR", the flow proceeds again to the STEP #1 in FIG. 6 and the same command is selected. If it is not decided that the transmitted data is the "COMMAND ERROR" in the STEP #5, it can be concluded that an incorrect command was erroneously transmitted from the camera body 2 to the lens 1 or an incorrect command was erroneously transmitted from the lens 1 to the camera body 2. In any case, an error was caused in the transmission line and, therefore, the flow ends at this stage.

Now, the light measuring system C6 as shown in FIG. 3 in which the exposure value is corrected by using the data of the reciprocal of the exit pupil position read by the flow which was described with reference to FIGS. 3–7 will be explained in detail, with reference to FIG. 8.

Figure 8:
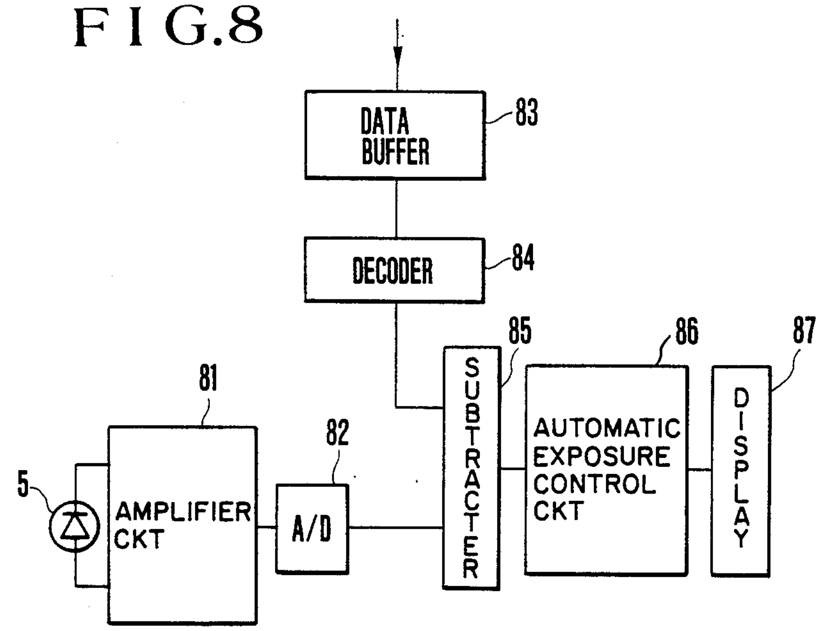
FIG. 8 is a block diagram showing construction of a light measuring device as shown in FIG. 3.
Figure 9:
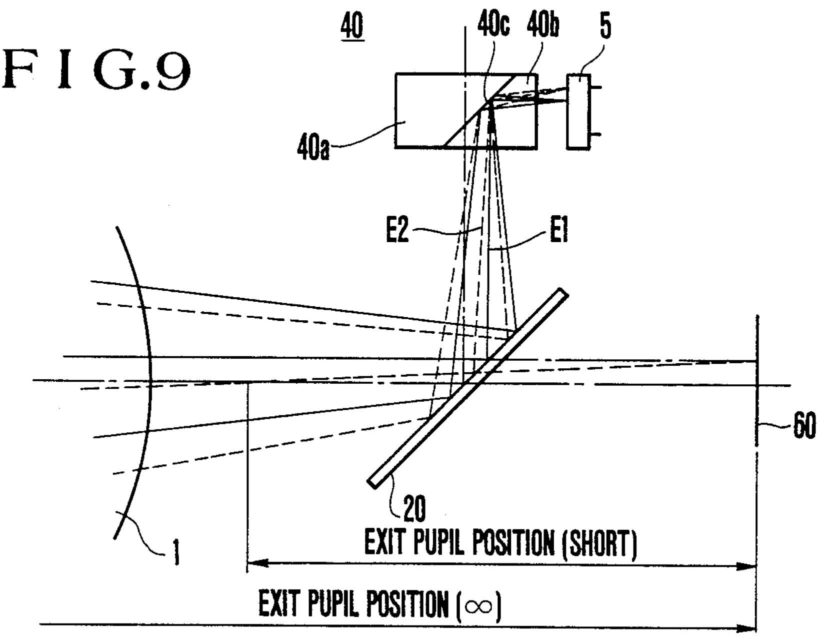
FIG. 9 is a diagram for explaining the phenomenon in which an error in light measurement is caused according to exit pupil position.

FIG. 8 is a block diagram showing the construction of the light measuring system which includes an amplifier circuit 81 which acts to apply logarithmic compression to the output current of the light receiving element to convert the same into a voltage and amplify said voltage, an A/D converter circuit 82 which converts the output of said amplifier circuit into a digital value, a data buffer 83 which stores the data transmitted from the photographic lens as the result of the execution of the command "Test Exit Pupil" in FIG. 4 according to the flow shown in FIGS. 6 and 7, that is, the data corresponding to the reciprocal of the exit pupil position, a decoder 84 which acts to decode the data stored in said data buffer to produce the error in light measurement as shown in FIG. 5, a subtracter 85 which subtracts the output of the decoder 84 from the output of the A/D converter 82 to correct the error n light measurement, an automatic exposure control circuit 86 for automatically controlling the exposure according to the output of the subtracter 85 and a display 87 for displaying the corrected exposure value.

According to the above-described construction, the data of the reciprocal of the exit pupil position transmitted from the photographic lens 1 is stored in the data buffer 83 and it is decoded by means of the decoder 84 to prove the error in light measurement. On the other hand, the output of the light receiving element 5 is amplified by the amplifier circuit 81 and is converted into digital signal by means of the A/D converter. By subtracting the error in light measurement from the output of the A/D converter 82, the automatic exposure control including no error in light measurement can be effected or the correct light measurement can be displayed.

In the above-described embodiment, the means for producing the information corresponding to the reciprocal of the exit pupil position of the photographic lens has been explained as consisting of the ROM L3 which is arranged in the photographic lens 1 and store the reciprocal of the exit pupil position of said photographic lens, the microcomputer L1 arranged in the photographic lens to read the data of the reciprocal of the exit pupil position from said ROM L3 and the microcomputer C1 arranged in the camera body. However, such information producing means may be so modified that the information of the exit pupil position is stored in the photographic lens and the information of the reciprocal of the exit pupil position is obtained by the operation executed in the microcomputer L1 or C1. It is also possible to provide a switch for manually setting the information of the reciprocal of the exit pupil, instead of providing such information from the photographic lens 1, and feed such information from said switch into the camera.

Further, in the above-mentioned construction, the means for applying correction to the exposure value according to the information of said information producing means has been explained as including the subtracter 85 which corrects the output of light measurement fed by the A/D converter 82. However, the correction of the exposure value is not necessarily made by correcting the output of the light measurement, and such correction may be made by correcting the shutter time, the diaphragm value or the like, which has been calculated by the automatic exposure control circuit 86 from the value of the light measurement, according to the information of said information producing means.

It will be understood that the present invention provides the information producing means for producing the information corresponding to the reciprocal of the exit pupil position of the photographic lens, whereby the error in light measurement value owing to the difference of the exit pupil position can be easily corrected.

What is claimed is:

1. A camera comprising:

(a) means for measuring light of a beam passing through a photographic lens into the camera and deciding an exposure value;

(b) means for generating an information corresponding to a reciprocal of an exit pupil position of said photographic lens; and (c) means for correcting said exposure value on the basis of an information proportional to the information generated by said information generating means.

2. A camera according to claim 1, further comprising: means for effecting a display corresponding to said exposure value.

3. A camera according to claim 1, further comprising: means for effecting exposure control according to said exposure value.

4. A camera according to claim 1, wherein said correcting means includes:

(a) means for converting the reciprocal of the exit pupil position generated by said information generating means into an exposure correcting value; and (b) means for applying the exposure correcting value obtained by said converting means to said exposure value.

5. A camera according to claim 1, wherein said information generating means is arranged in said photographic lens.

6. A camera in accordance with claim 1 wherein:

said information generated by said generating means corresponds linearly to the reciprocal of an exit pupil position of said photographic lens.

7. A camera system comprising:

(A) a camera body including;

(a) means for measuring light of a beam passing through a photographic lens into the camera body and deciding an exposure value;

(b) means for reading an information corresponding to a reciprocal of an exit pupil position from said photographic lens; and (c) means for correcting said exposure value according to an information proportional to the said reading means; and (B) a photographic lens including;

(a) means for storing the information corresponding to the reciprocal of the exit pupil position of said photographic lens.

8. A camera system according to claim 7, wherein said means for deciding the exposure value includes:

(a) means for measuring light of the beam passing through the photographic lens into the camera; and (b) means for deciding the exposure value according to a light measurement value measured by said light measuring means.

9. A camera system according to claim 7, wherein said reading means reads the information corresponding to the reciprocal of the exit pupil position from said storing means.

10. A camera system according to claim 7, wherein said correcting means includes means for converting the information corresponding to the reciprocal of said exit pupil position into an exposure correcting value.

11. A camera system according to claim 8, wherein said light measuring means includes:

(a) means for dividing a beam passing through said photographic lens; and (b) means for receiving the beam divided by said dividing means.

12. A camera system according to claim 7, wherein said photographic lens further includes:

(a) means for reading an information corresponding to the reciprocal of said exit pupil position from said information storing means in response to said reading means and transmitting said information to said camera body.

13. A camera system in accordance with claim 7 wherein:

said information read by said reading means corresponds linearly to a reciprocal of an exit pupil position of said photographic lens; and said information stored by said storing means corresponds linearly to the reciprocal of an exit pupil position of said photographic lens.

14. A camera body for use with a photographic lens including means for storing an information corresponding to a reciprocal of an exit pupil position of said photographic lens, comprising:

(a) means for measuring a light of a beam passing through a photographic lens into the camera body and deciding an exposure value;

(b) means for reading the information corresponding to the reciprocal of the exit pupil position from said photographic lens; and (c) means for correcting said exposure value in accordance with an information proportional to the information read by said reading means.

15. A camera body according to claim 14, wherein said means for deciding the exposure value includes:

(a) means for measuring a light of a beam passing through said photographic lens into the camera body; and (b) means for deciding an exposure value on the basis of a light measurement value measured by said light measuring means.

16. A camera body according to claim 14, wherein said reading means reads the information corresponding to the reciprocal of the exit pupil position from said storing means.

17. A camera body according to claim 14, wherein said correcting means includes means for converting the information corresponding to the reciprocal of said exit pupil position into an exposure correcting value.

18. A camera body according to claim 15, wherein said light measuring means includes:

(a) means for dividing a beam passing through said photographic lens; and (b) means for receiving the beam divided b said dividing means.

19. A camera body in accordance with claim 14, wherein:

said information read by said reading means corresponds linearly to the reciprocal of an exit pupil position of said photographic lens.

20. A photographic lens for use with a camera body, said camera body having means for measuring light of a beam passing through said photographic lens and deciding an exposure value in accordance with an information proportional to a data stored in said lens, said photographic lens comprising:

(a) means for mounting said lens to said boy; and (b) means for storing an information corresponding to the reciprocal of the exit pupil position of said photographic lens.

21. A photographic lens according to claim 20, further comprising:

(a) means for reading said information corresponding to the reciprocal of the exit pupil position from said storing means in response to said reading means and transmitting said information to said camera body.

22. A camera system in accordance with claim 20, wherein:

said information stored by said storing means corresponds linearly to the reciprocal of an exit pupil position of said photographic lens.

* * * * *